Oct. 29, 1968 W. H. ROBINSON 3,407,957

FRANGIBLE CLOSURE

Filed June 15, 1966 6 Sheets-Sheet 1

INVENTOR.
WILLIAM H. ROBINSON
BY Irvin V. Gleim
Edward M. Tittle
ATTORNEYS

INVENTOR.
WILLIAM H. ROBINSON
BY Irvin V. Gleim
Edward M. Fitle
ATTORNEYS

INVENTOR.
WILLIAM H. ROBINSON
BY Irvin V. Gleim
Edward M. Little
ATTORNEYS

INVENTOR.
WILLIAM H. ROBINSON
BY Irwin V. Gleim
Edward M. Tuttle
ATTORNEYS

INVENTOR.
WILLIAM H. ROBINSON
BY Irvin V. Gleim
Edward M. Fitzle
ATTORNEYS

INVENTOR.
WILLIAM H. ROBINSON
BY Irvin V. Gleim
Edward M. Fitzle
ATTORNEYS 3,407,957
FRANGIBLE CLOSURE
William H. Robinson, New Vienna, Ohio 45159
Continuation-in-part of application Ser. No. 404,720, Oct. 19, 1964. This application June 15, 1966, Ser. No. 557,837
19 Claims. (Cl. 215—42)

ABSTRACT OF THE DISCLOSURE

A cup-like container closure of flexible thermoplastic material having a removable portion defined by an annular groove on the inner side. A gripping member is connected to the removable portion and is outwardly spaced from the closure. Tamper-resistant means is severably connected between the gripping member and the outer side of the closure.

This application is a continuation-in-part of co-pending application Ser. No. 404,720 filed Oct. 19, 1964, now Patent Number 3,257,002, for "Closure."

This invention relates generally to merchandise packaging wherein merchandise is placed within a container and sealed therein in a tamper resistant manner and, more particularly, to dual-purpose closures that are especially suitable for vacuum or hermetic sealing of containers and for effective and easy resealing of such containers for reuse after the original vacuum or hermetic seal has been broken.

In the packaging of food and/or beverages as well as other merchandise, it is desirable to provide closure means that can be easily and economically produced in desired quantities and which are useful and effective to enclose various types of contents within various types of containers. In certain instances, it is desirable that the container-closure combination be sealed in a manner capable of preventing leakage when the seal is subjected to a high pressure differential so as to be useful to provide a gas or vapor barrier when vacuum packaging filling and sealing methods are employed. In other instances, a hermetic seal capable of providing air tightness or moisture tightness at relatively low pressure differentials is sufficient. In still other instances, it may be sufficient that the sealing means merely provide sufficient connection between the closure and a container so that the closure functions essentially as a cover to avoid spillage of the contents of the container or to avoid contamination of the contents thereof by foreign material.

Closure members in accordance with the present invention preferably employ structures of molded plastic material or a combination of such material with other material in order to provide a tough durable structure having substantial elasticity or resilience and dimensional stability and which is capable of being sealed by various sealing methods including heat sealing or welding or sealing by the use of a sealing compound of known type such as plastisols, organosols, sealants of the heat or pressure sensitive type, or by the use of a suitable solvent. Such plastic materials may include, for example, polyethylene, polypropylene, polystyrene, and resinous materials such as polyvinyl chloride and the like although the invention is not necessarily limited thereto. The closure devices and containers employed therewith may have various shapes and configurations such as, for example, circular, oval, polygonal, etc. Additionally, closures and containers in accordance with the invention may be utilized for packaging, either under a hermetic or a vacuum type seal, various liquids or solids including food, beverages, dairy products, drugs, industrial, commercial and other products such as metals, chemicals, poisonous materials, nuts, bolts, nails, etc.

Accordingly, it is an object of the invention to provide an improved dual-purpose closure member.

Another object of the invention is to provide a closure device having portions adapted to tightly engage or to be sealed to surface portions of a container, and a removable tear strip together with readily accessible grasping means therefor.

A further object is to provide a device of the character described for effectively sealing contents within a container and which may be readily opened with a minimum of effort and thereafter either may be used to reseal the container or may be discarded.

Another object is to provide an improved device of the character described which is simple and durable in construction and which can be readily and inexpensively manufactured which will reliably and effectively provide a fluid tight seal between the interior of a container and the ambient atmosphere.

Still another object of the invention is to provide an improved device of the character described which includes unique structural features which simultaneously perform the dual function of providing tamper resistance while maintaining such structural elements in a desired position during manufacturing operations without interfering with the ready accessibility thereof and also simultaneously providing visual indication regarding the integrity of the seal.

A further object of the invention is to provide an improved combined rigid and flexible closure member for a container.

These and other objects of the invention will become apparent from the following description taken in conjunction with the accompanying drawings wherein.

Figures 1, 4:
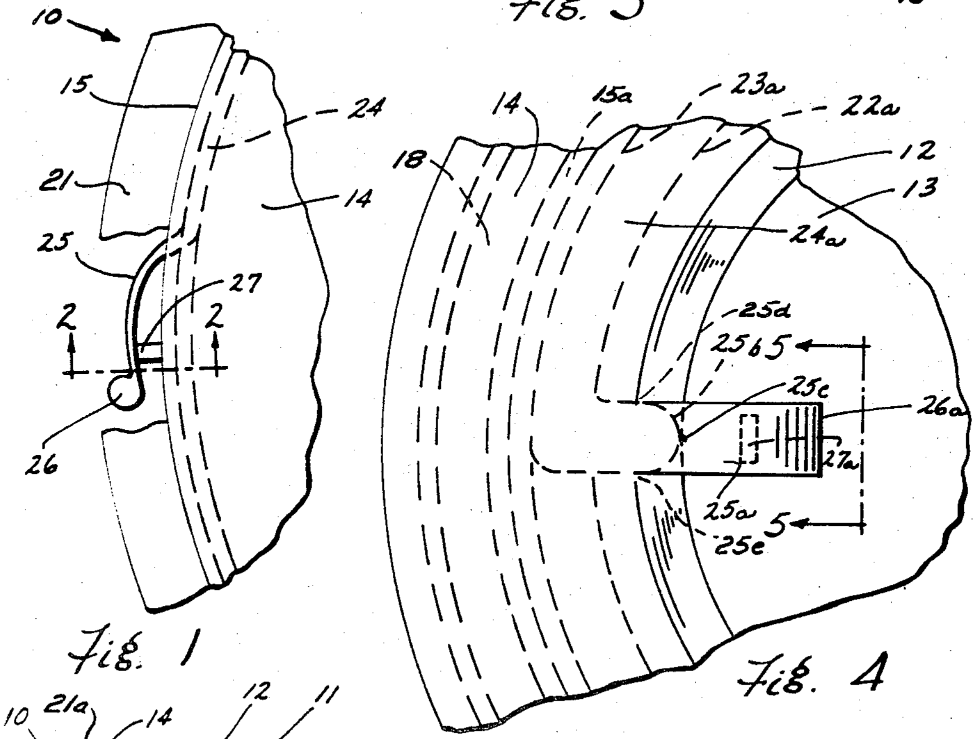
FIGURE 1 is a fragmentary plan view of a merchandise package embodying certain aspects of the invention.
FIGURE 4 is a fragmentary plan view of the closure of FIGURE 3.
Figure 2:
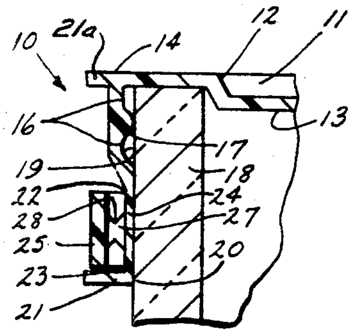
FIGURE 2 is a fragmentary sectional view looking in the direction of arrows 2—2 in FIGURE 1.

Referring to FIGURES 1 and 2 of the drawings, a closure in accordance with the present invention is generally indicated at 10 and includes a top 11 which may be provided with an annular shoulder 12 forming a depressed center portion 13 and a slightly raised rim 14. An annular skirt 15 depends from rim 14 and includes a upper outwardly offset portion 16 spaced by means of an internal rib 17 from the outer side wall of a container 18. An inwardly and downwardly inclined portion 19 connects offset portion 16 with a lower skirt portion 20 which closely engages the outer side wall of container 18. At its bottom edge, lower skirt portion 20 is provided with a flange 21. Lower skirt portion 20 is provided with a pair of annular spaced apart parallel score lines 22, 23 which define therebetween a removable tear strip 24.

Connected to one end of tear strip 24 is an outwardly extending strip 25 which terminates in a finger grip 26. Between strip 25 and tear strip 24 is a further connection to provide a tamper resistant feature. This is accomplished in accordance with the invention by the provision of a member 27 extending between and connected to tear strip 24 as well as to strip 25. If desired, member 27 may be provided with a notch 28 for a purpose which will become apparent as the description proceeds.

To facilitate handling of the closure 10 during various phases of the manufacturing thereof, there may be provided a flange 21*a*, similar to flange 21, located adjacent the upper edge of skirt 15. In such case, the radii of flanges 21, 21*a* should be at least equal to and preferably slightly greater than the radius of the outermost point of either strip 25 or strip 26.

From the foregoing, the use and operation of the closure should be readily understandable. Container 18 is filled with its contents and the closure 10 is positioned thereon with lower skirt portion 20 tightly engaging the outer side wall of container 18 to effect a seal therewith. If desired, lower skirt portion 20 may be sealed to the wall of the container by known sealing methods including sealing or welding or by the use of a sealing compound which may be of the heat or pressure sensitive type or may be a suitable solvent. After sealing, when access to the container is desired, grip 26 is grasped and pulled to break the tamper resistant connection provided by member 27. Notch 28 provides a weakened area in member 27 so that it may be readily broken or severed when it is desired to open the sealed container and yet provides sufficient strength to provide resistance to tampering or accidental breakage of the seal as well as a visual indication of integrity of the seal. After member 27 has been broken, tear strip 24 defined between score lines 22, 23 is then torn by continued pulling on strip 25 until tear strip 24 has been completely severed and removed. The upper portion of closure 10 can then be removed by grasping it and lifting it from container 18. When it is desired to reclose the device, closure 10 is simply pushed downwardly and the offset upper portion 16 of the skirt and its inwardly extending rib 17 will relatively tightly engage the outer surface of container 18 to seal the same, thus providing a cover which may be reopened and reclosed numerous times.

Throughout the drawings, like numerals designate like parts. Thus, in the embodiment illustrated in FIGURES 3–5 inclusive, the downwardly inclined portion 19 and the lower skirt portion 20 are omitted, and score lines 22, 23 and tear strip 24 are provided in a different location.

Figure 3:
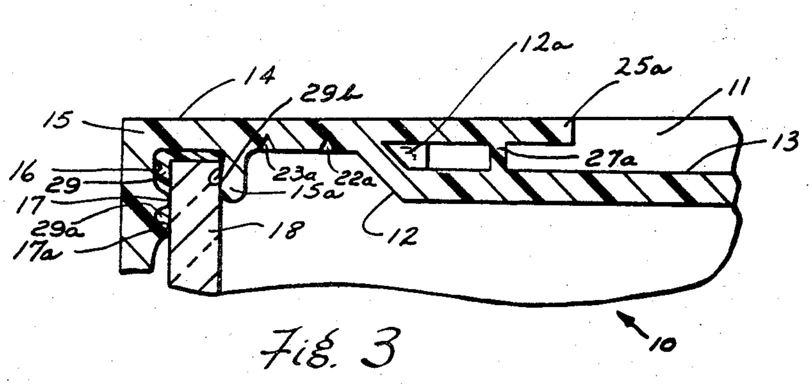
FIGURE 3 is a side sectional fragmentary view of a merchandise package illustrating a modified embodiment of the invention.

As is best shown in FIGURES 3 and 4, score lines preferably are provided on the internal surfaces of the closure and score lines 22*a*, 23*a* define a tear strip 24*a* in the raised rim portion 14 of closure 10. Connected to one end of tear strip 24*a*, is a strip 25*a* which extends inwardly from the tear strip. Between the point of connection between tear strip 24*a* and strip 25 and the free end 26*a* of strip 25*a*, a tamper resistant connection is provided between strip 25*a* and the depressed center portion 13 of closure 10. Such connection is provided by member 27*a* which may be notched at 28*a* and connected at its ends to depressed center portion 13 and to strip 25*a*.

In accordance with the invention, it is desirable to provide means to insure points of stress concentration at the desired locations during the tearing operation. This is achieved by provision of a portion 12*a* extending outwardly from shoulder 12 and lying beneath strip 25*a* and forming therewith along the surface of strip 25*a* a line of intersection and stress concentration as indicated by broken line 25*b*. As illustrated, portion 12*a* is rounded but it will be appreciated that the invention is not necessarily limited to such configuration which may be triangular or of other shaped configuration to provide the points of stress concentration at the desired location. Preferably, the shape of stress concentration line 25*b* is such that, upon lifting strip 25*a* and after breaking member 27*a*, stress is initially concentrated at point 25*c* and after initial rupture at point 25*c*, tearing occurs along line 25*b* to points 25*d*, 25*e* and thereafter along lines 22*a*, 23*a*.

Figure 5:
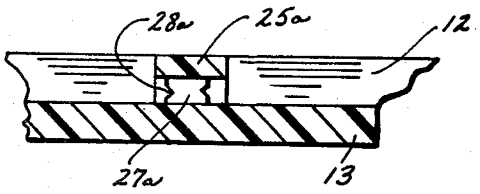
FIGURE 5 is a fragmentary sectional view looking in the direction of arrows 5—5 in FIGURE 4.

The embodiment illustrated in FIGURES 3–5 further differs in the additional provision of a second annular depending skirt 15*a* spaced inwardly from outer portion 16 and its inwardly projecting ribs 17, 17*a*. The spacing between the outer surface of skirt 15*a* and the inner surfaces of ribs 17, 17*a* is such that the wall surfaces of container 18 are tightly gripped thereby. Also, the inner surfaces of skirt 15 and ribs 17, 17*a* and the outer annular surface of skirt 15*a* cooperate with the wall surfaces of container 18 to form annular spaces 29, 29*a*, 29*b* for receiving a sealing compound.

Use and operation of the embodiment illustrated in FIGURES 3–5 inclusive is essentially similar to that previously illustrated and described in connection with FIGURES 1 and 2. Container 18 is filled with its contents and closure 10 is positioned thereon with the gripping engagement between the surfaces of internal skirt 15*a* and ribs 17, 17*a* with the exterior surfaces of container 18 providing a tight seal to protect the contents. If a vacuum or hermetic type seal is desired, a sealing compound may be applied either to container 18 or to the inner and outer surfaces, respectively, of skirt portions 15, 15*a* prior to positioning the closure on and in gripping engagement with surfaces of container 18. Sealing may then be effected as noted heretofore to retain the contents of the container in a sealed condition and thereby providing airtightness and/or moisture-tightness.

When access to the contents of the container is desired, the free end of strip 25*a* is grasped and lifted to break tamper resistant member 27*a*. Continued lifting action exerted upon strip 25*a* results in stress concentration along lines 25*b*, 25*c*, 25*d*, 25*e*, as noted heretofore, ultimately resulting in a lifting and severing of tear strip 24*a* along lines 22*a*, 23*a*. Tear strip 24*a* may be partially rather than completely severed so as to provide access to the interior of container 18 and its contents in which case the central portion of the closure remains secured in place as a substantial cover to prevent accidental entry of foreign material into the interior of container 18. Alternatively, tear strip 24*a* may be completely severed and then discarded.

Figure 6:
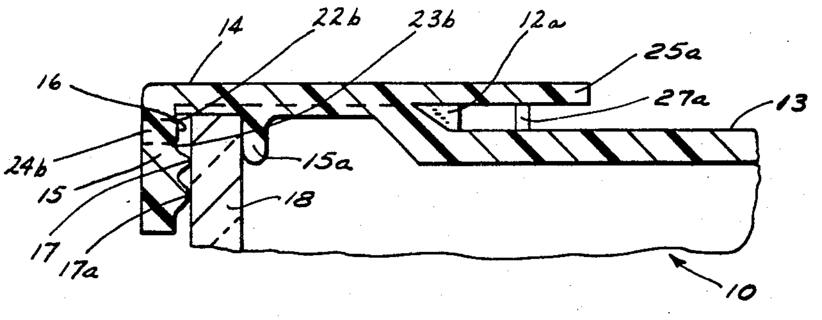
FIGURE 6 is a view similar to FIGURE 3 illustrating a further modified embodiment.
Figure 7:
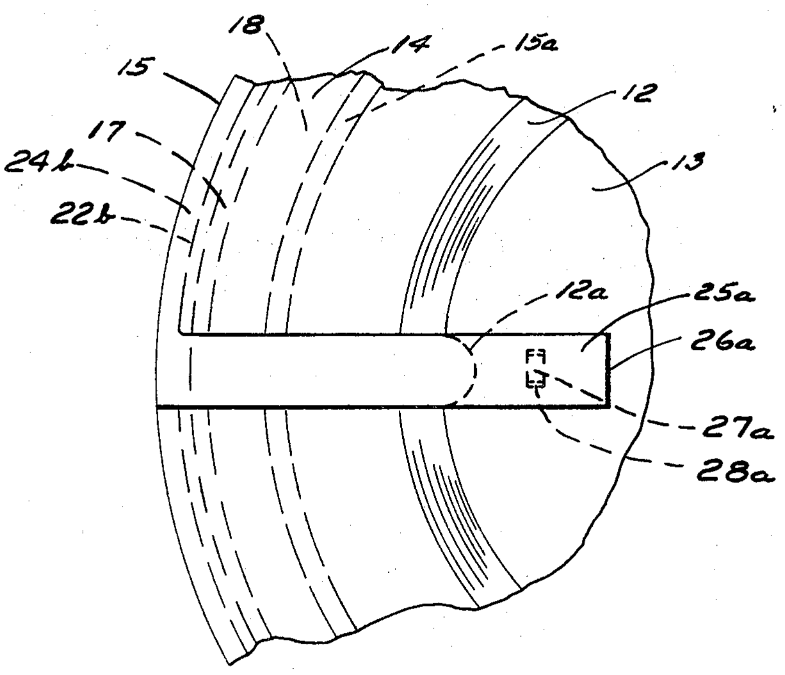
FIGURE 7 is a fragmentary plan view of the closure of FIGURE 6.

A closure embodying the invention is illustrated in FIGURES 6, 7 which differs from that illustrated in FIGURES 3–5 inclusive in that score line 22*b*, 23*b* and tear strip 24*b* are disposed within outer portion 16 above rib 17. Use and operation of the device is substantially identical with that described in connection with FIGURES 3–5 inclusive except that in the embodiment illustrated in FIGURES 6, 7, complete severance of tear strip 24*b* from the skirt portion of closure 10 leaves a reusable cover portion useful to reclose and reseal the contents of container 18.

Figure 8:
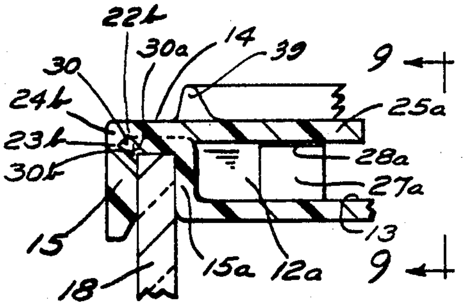
FIGURE 8 is a fragmentary sectional view illustrating a modification of the embodiment illustrated in FIGURE 6.
Figure 9:
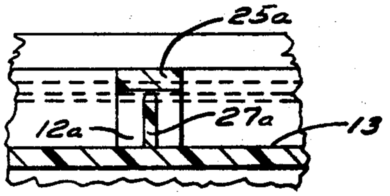
FIGURE 9 is a fragmentary sectional view looking in the direction of arrows 9—9 in FIGURE 8.
Figures 10, 11:
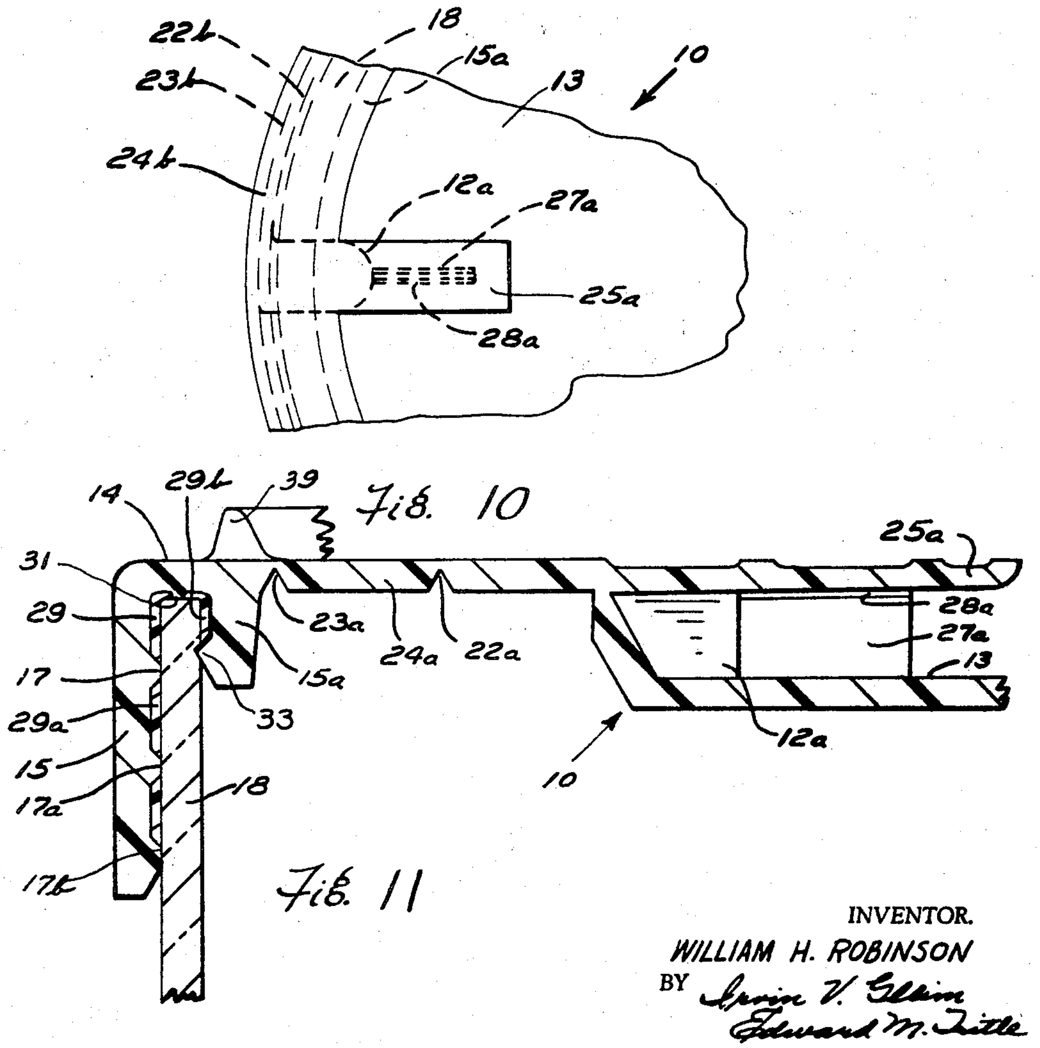
FIGURE 10 is a fragmentary plan view of the closure of FIGURE 8.
FIGURE 11 is a fragmentary sectional view illustrating a modification of the embodiment of FIGURE 3.

The embodiment illustrated in FIGURES 8–10 inclusive is a further modification of the embodiment shown in FIGURES 3–5 inclusive and FIGURES 6, 7. In FIGURES 8, 9, internal ribs 17, 17*a* are omitted and skirt 16 and internal skirt 15*a* are suitably dimensioned for sealing to and/or frictional sealing engagement with the inner and outer surfaces of container wall 18. At the juncture between rim 14 and outer skirt 15, there is provided an internal annular groove defined by internal wall portions 30, 30*a*, 30*b*. The corners or inner sections between annular wall 30, 30*a* define score or groove 22*b* and, similarly, the corner or intersection between wall 30, 30*b* defines score or groove 23*b*. Grooves 22*b*, 23*b* are thereby similar to score lines 22, 23 and thus define therebetween a tear strip 24*b*.

Use and operation of the closure illustrated in FIGURES 8–10 inclusive is essentially like that illustrated in FIGURES 6, 7. Upon severance of tear strip 24*b* as a result of the lifting and tearing action exerted by strip 25*a*, the central portion 13 and rim portion 14 of closure 10 constitute a reusable and reclosable cover which can be removed from the container and replaced thereon to reclose the same as desired.

Figures 12, 13, 14, 15:
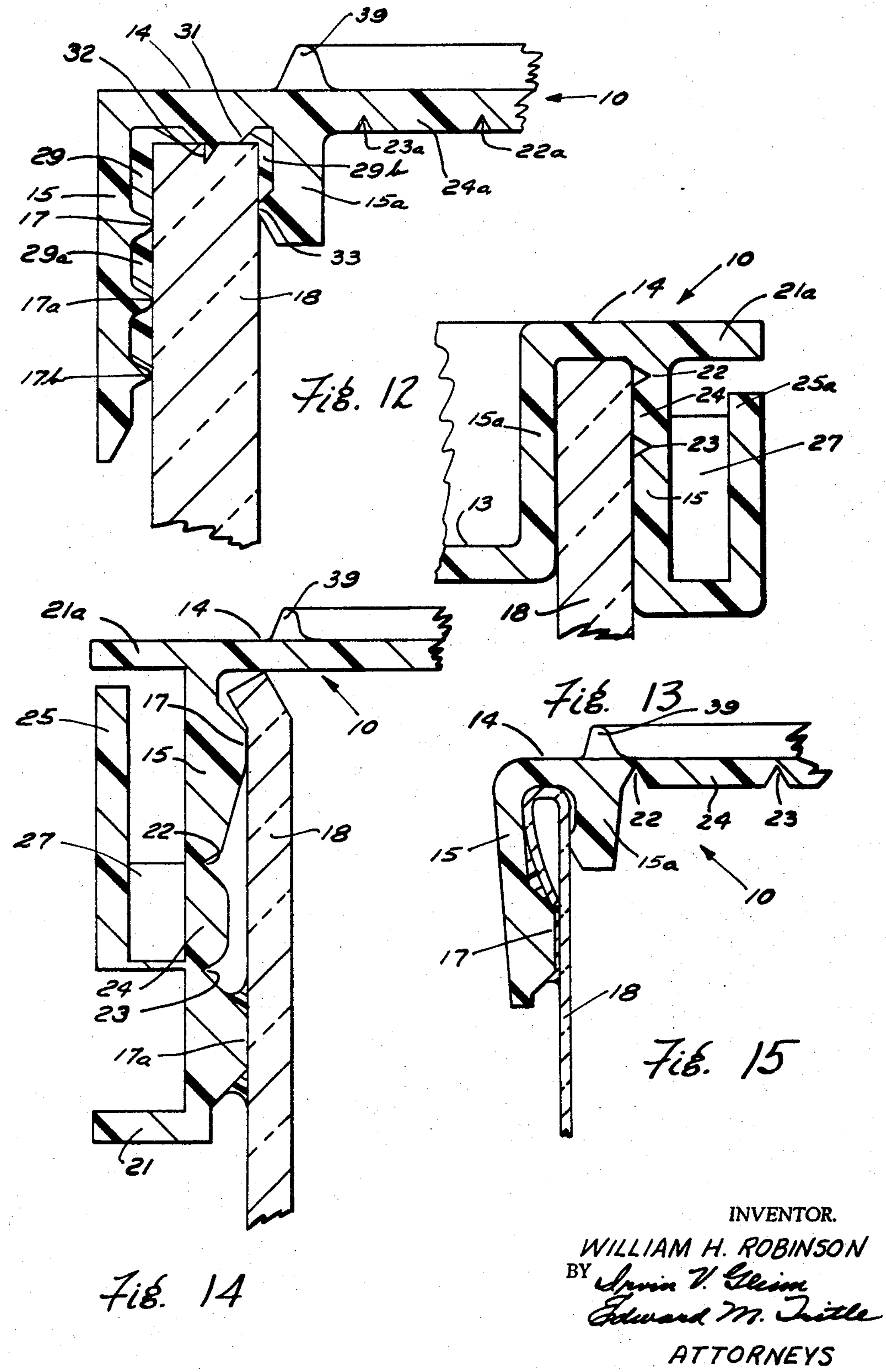
FIGURE 12 is a fragmentary sectional view on an enlarged scale further illustrating details of the embodiment of FIGURE 11.
FIGURE 13 is a fragmentary sectional view illustrating another embodiment of the invention.
FIGURE 14 is a fragmentary sectional view illustrating a modification of the embodiment illustrated in FIGURE 6.
FIGURE 15 is a fragmentary sectional view illustrating a modification of the embodiments illustrated in FIGURES 3 and 11.

Closures in accordance with the present invention are useful to seal container structures which may be made of glass, plastic material, metal, ceramic material, paper, or a combination of paper and metal foil. The aspects of the invention shown in FIGURES 11, 12 shows a closure 10 which is particularly suited for use in connection with containers made of paper or a combination of paper and metal foil. The embodiment shown in FIGURES 11, 12 is essentially like that shown in FIGURES 3–5 inclusive but differs essentially in the provision of a plurality of ribs 17, 17*a*, 17*b* on the internal surface of skirt 15, the provision of an internal rib 31 having a barb 32 projecting downwardly therefrom on the internal lower surface of rim portion 14, and an outwardly projecting rib 33 provided at or near the lower extremity of internal skirt portion 15*a*.

Use and operation of the embodiment illustrated in FIGURES 11, 12 is essentially like that shown in FIGURES 3 and 5 except that when either container 18 or closure 10 is previously coated with a sealing compound as noted heretofore and are positioned together, barb 32 projects inwardly into the top surface of container wall 18 thereby providing a more positive engagement therewith. Additionally, the paper fibers are impregnated to some degree by the sealing compound thereby effecting an improved sealing bond between closure 10 and wall 18 of the container. During certain sealing operations, barb 32 and the other structural features disclosed herein synergistically provide additional and unexpected advantages.

In FIGURE 13, there is illustrated a modification of the invention which is similar to that shown in FIGURES 6–7 but differs in that the depressed center portion 13 of the closure is joined to the internal skirt portion 15*a* with rim portion 14 serving to connect internal skirt portion 15*a* with skirt portion 15. Internal ribs 17 are omitted and strip 25*a* and tamper resistant member 27 are disposed outwardly from tear strip 24 which is disposed within skirt portion 15. If desired, a flange 21*a* may project outwardly from the upper portion of skirt 15 to facilitate handling of the closures during various stages of the manufacture thereof.

In use and operation, closure 10 is positioned on wall 18 of a container with wall 18 interposed between skirt portions 15, 15*a* and a suitable seal effected between skirt portion 15 and wall 18. When it is desired to obtain access to the contents of the then sealed container, tear strip 24 is severed and removed by lifting strip 25 to first break the tamper resistant member 27 and thereafter remove the tear strip in the manner noted heretofore. Upon severance and removal of tear strip 24, rim portion 14, inner skirt portion 15*a* and central portion 13 remain for use as a cover for reclosing and resealing a container 18 as desired.

A further modification of the embodiment illustrated in FIGURES 1–2 is illustrated in FIGURE 14 wherein ribs 17, 17*a* are spaced apart with score lines 22, 23 and tear strip 24 disposed between said spaced apart ribs. In other respects, closure 10 and its use and operation are as described in connection with FIGURES 1 and 2.

In FIGURE 15, there is shown a modification of the embodiment illustrated in FIGURES 3–5 inclusive which differs only in modifications required to make the embodiment of FIGURE 3 suitable for use in connection with a metallic type of container, the principal difference being that prior to placing closure 10 on wall 18 of the container, either container 18 or the internal surfaces of skirt portion 15 particularly in the vicinity of rib 17 are coated with a sealing compound to effect the seal between the closure and the container wall 18. In other respects, use and operation of the closure of FIGURE 15 is essentially like that described in connection with FIGURES 3–5 inclusive.

Figure 16:
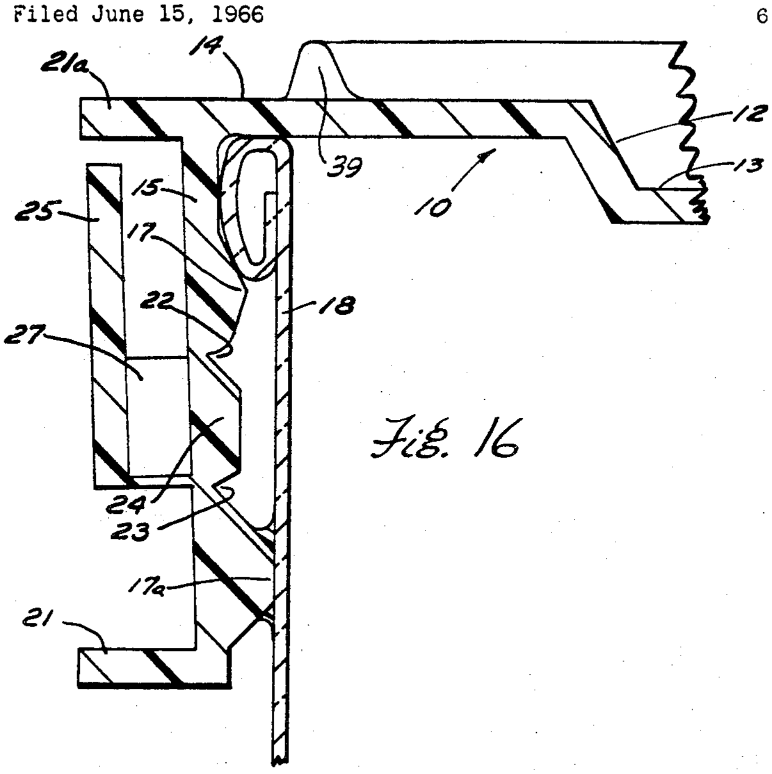
FIGURE 16 is a fragmentary sectional view illustrating an embodiment similar to that shown in FIGURE 14.

In FIGURE 16, there is shown a further modification to provide a reclosable type of closure suitable to be sealed to a metal type of can and which is essentially like the embodiment illustrated in FIGURE 14.

In addition to the above noted requirements of economy, toughness, durability, sealability, the utilization of molded plastic materials provides other advantages known in the prior art. For example, plastic material such as polyethylene, polystyrene, polyvinyl chloride and the like are characterized by chemical inertness, and these plastics are generally resistant to water, acid and alkalis. Additionally, the prior art discloses that such characteristics are known, as well as the suitability of such plastic materials for use in containers and closures for packaging food products, dairy products, pharmaceuticals, etc. The prior art further teaches that in some instances such materials per se require further treatment in order to render the material suitable for such uses. For example, the prior art discloses the desirability of irradiation or other treatment of such material in order to obtain microporosity in order to permit the passage of gases but precluding the passage of moisture where the contents of a container require freezability. In contrast thereto, it has been discovered that ordinary polyethylene closures in accordance with the structural features disclosed herein lose dimensional stability as well as ability to maintain proper seal when such materials are exposed to certain kinds of contents such as petroleum distillates. Sometimes, exposure to such contents results in swelling and loss of dimensional stability so that a seal is not maintained between the closure and the container. In contrast thereto, it has been found that the utilization of high density polyethylene closures having identical structural features and dimensions do effect and maintain a satisfactory seal when exposed to such contents.

In all of the embodiments illustrated and described to this point, it is desirable for ease of handling both from the viewpoint of the closure manufacturer, the packer, and the consumer user that the closures be formed of flexible and stretchable material. However, in certain utilitarian aspects of the invention, it may be desirable to combine a relatively rigid member with a relatively flexible closure member to provide additional strength, particularly when a vacuum is to be maintained within the container and to provide a satisfactory sealing cover for such a container after the vacuum has been broken. One such aspect of the invention is illustrated in FIG- URE 17. In this instance, the closure device comprises a relatively rigid member or disc 34 as, for example, of metal and of sufficient rigidity to withstand the absolute or partial vacuum within a container wall 18 without appreciable deflection of disc 34 and which is provided adjacent its peripheral edge with an annular trough 35, the surface of which is provided with a sealing compound or gasket 36 which is resilient or rubberlike in consistency. Disc 34 is provided with vacuum release means, indicated generally at 37, whereby a housewife or other user may easily relieve the vacuum and/or hermetic seal in order to gain access to the contents of the container. An understanding of the release means is not essential to an understanding of the present invention and it is therefore not shown or described in detail.

The flexible portion of this form of the invention comprises a closure member 10 quite similar to that disclosed and shown in FIGURE 16 except that tear strip 24, lower bead 17a and lifting strip 25 and tamper proof member 27 have been omitted. Additionally, the relative dimensions of the various elements have been modified so that outwardly offset portion 16 is spaced from wall 18 of the container by rib 17 by an amount sufficient to accommodate annular trough 35 having the sealant of gasket material 36 therein. If desired, a band 38 of suitable material such as metal or plastic, may be shrunk by application of heat or otherwise secured to wall 18 of the container and to the skirt portion of closure 10 to provide a tamper resistant feature.

In use and operation of this form of the invention, it is to be understood that the contents of container 18 are vacuum or hermetically sealed therein in a known manner by utilizing the walls 18, relatively rigid member 34 and the sealing compound or gasket 36 to achieve and maintain the desired sealing. When it is desired to remove the contents or a portion of the contents from container 18, tamper resistant band 38 is removed either by cutting or by peeling the same from closure 10. Closure 10 is then removed quite easily by virtue of its flexibility and the housewife or other user then manipulates the vacuum release means 37 to relieve the vacuum or the pressure within container 18. Relatively rigid member 34 may then be removed by prying or otherwise lifting annular trough 35 and the sealing or gasket material 36 from the upper edge of walls 18 of the container. After access to the contents of the container has thus been obtained, closure member 10 then provides a cover for reclosing and sealing the container either with or without the previous insertion of relatively rigid member 34.

Figure 17:
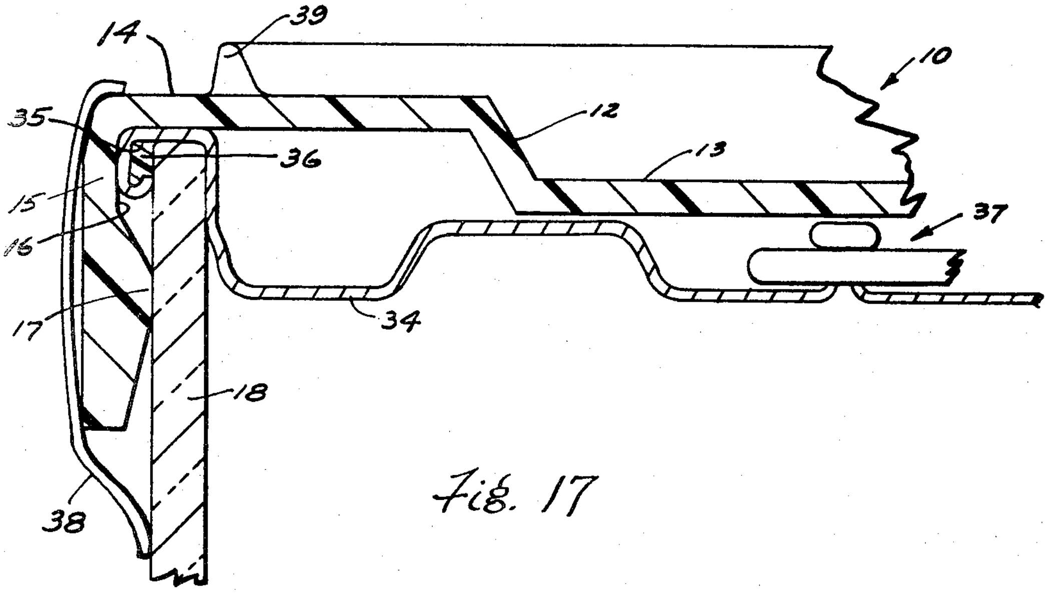
FIGURE 17 is a fragmentary sectional view illustrating a combined rigid and flexible member aspect of the invention.
Figures 18, 19:
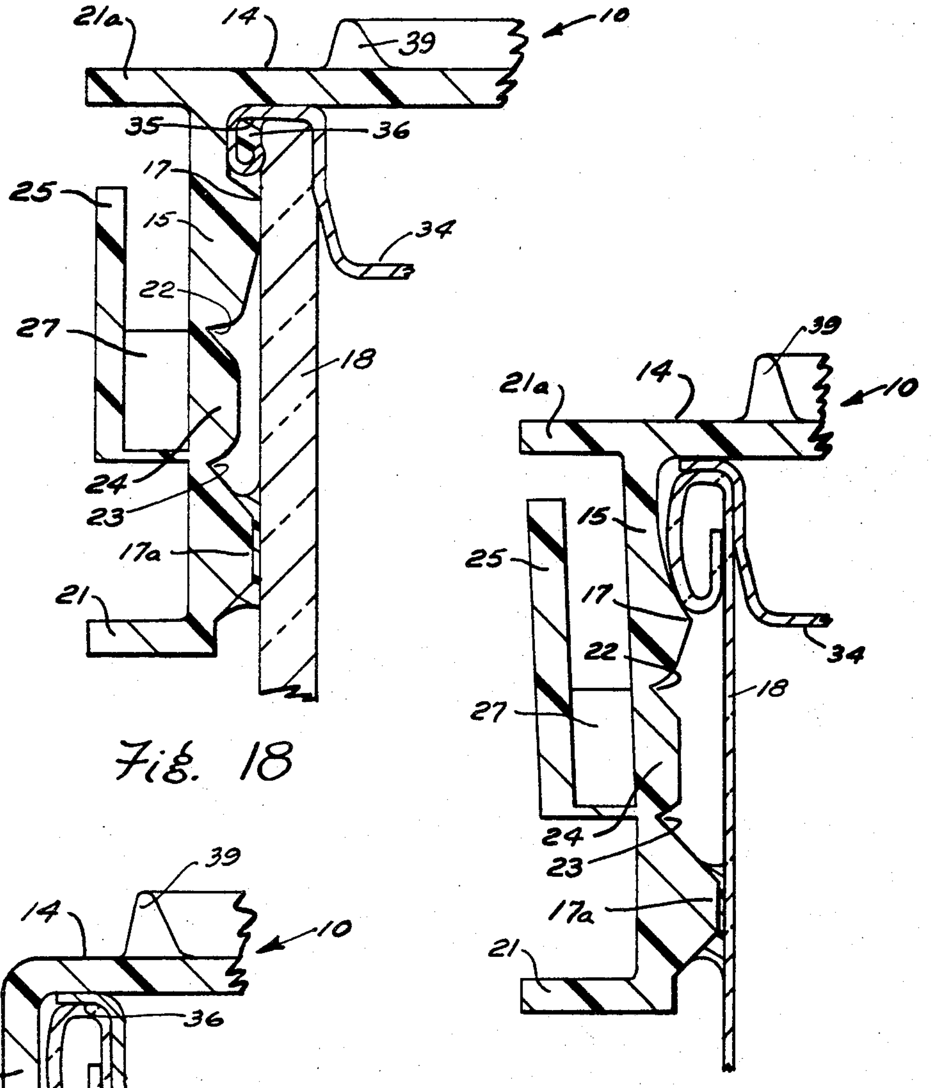
FIGURE 18 is a fragmentary sectional view similar to FIGURES 14 and 16 but illustrating a combined rigid and flexible member aspect of the invention.
FIGURE 19 is a fragmentary sectional view illustrating a further modification similar to that illustrated in FIGURE 18; and, FIGURE 20 is a fragmentary sectional view of still another aspect of the invention.

In the embodiment shown in FIGURE 18, closure member 10 differs from that of FIGURE 17 in that closure member 10 includes a tear strip and removal means therefor including a tamper resistant device and the lower portion of closure 10 is sealed to wall 18 of the container. In this form of the invention, the tear strip, its removal means and the tamper resistant feature as well as the entire lower portion of skirt 15 are essentially as illustrated and shown in connection with FIGURE 14, the skirt portion being sealed to wall 18 of the container below the tear strip 24. In such case, band 38 is not needed and after removal and severance of tear strip 24 as described in connection with FIGURE 14, use and operation of this form of the invention are as described above in connection with FIGURE 17.

In the embodiment of the invention illustrated in FIGURE 19, the difference between this embodiment and that described in FIGURE 18 consists primarily in that in certain instances, the sealant or gasket 36 may be eliminated. Otherwise, the structure, use and operation are the same as described in connection with FIGURE 18.

Figure 20:
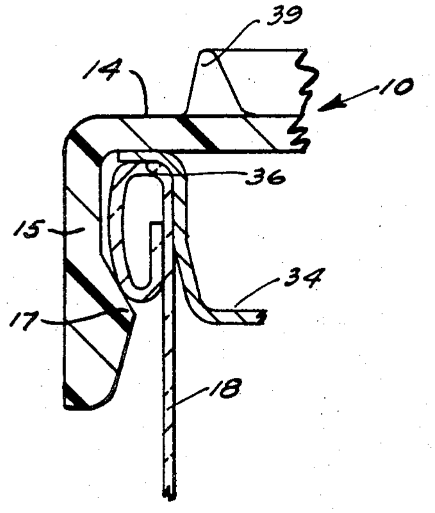

In the embodiment shown in FIGURE 20, the principal difference is that the embodiment of FIGURE 20 is intended for sealing a metal type container whereas that previously described in connection with FIGURE 17 was intended for use in connection with containers made of paper or a composite of paper and metal foil. Accordingly, the essential difference between FIGURES 17 and 20 is that the sealant or gasket 36 is disposed between the upper surface of wall 18 of the container and the relatively rigid member 34 in FIGURE 20. In other respects and in use and operation, the embodiment of FIGURE 20 is like that of FIGURE 17.

In FIGURES 3, 6, 8, 11, 12, 13, 17 and 18, the wall surfaces of container 18 are tightly gripped, as noted above, to compress the wall fibers without damage to the wall in order to provide substantial protection against wicking.

In FIGURES 8, 11, 12 and 14–20, there is shown an annular rib 39 carried by and upstanding from rim portion 14 of cover 10. The outer radial dimension of rib 39 is such, and preferably less than the internal diameter of the lower bead of container 18, that containers or other closures 10 may be received and positioned over and by rib 39 in stacked relation. In this connection, the sides of rib 39 may be converging rather than parallel, as shown in the drawings, to facilitate proper positioning of a container 18 or another closure 10 into such stacked relation.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. A relatively shallow cup-like closure of flexible thermoplastic material for sealing engagement with the open end of a container wall having a continuous side portion substantially free from outward projections and inward depressions, said closure having a wall having an inner side and an outer side and defining a top and a skirt depending from said top for encompassing said side portion, said wall also defining an annular groove at the inner side thereof and forming therein an imperforate weakened section encompassing a removable portion, means for removing said removable portion including a lifting and gripping member connected thereto and having a distal end spaced from said outer side, and tamper-resistant means including a member severably connected between said member and said outer side.

2. A closure in accordance with claim 1 wherein said tear portion is disposed adjacent the periphery of said closure.

3. A closure according to claim 2 wherein said lifting and gripping member is disposed on said skirt portion and between a pair of spaced apart flanges having circular peripheral surfaces for rolling contact with a surface apart from said closure.

4. A closure in accordance with claim 2 wherein said closure additionally includes a top having a relatively raised rim portion and a relatively depressed central portion, said weakened section being disposed adjacent said rim portion, and said gripping member and said severably connected member are disposed within said central portion.

5. A closure in accordance with claim 2 wherein said lifting and gripping member is outwardly offset from said tear portion.

6. A closure in accordance with claim 1 wherein said skirt includes an upper outwardly offset portion having an inwardly extending annular rib and connected to a lower portion for closely engaging an outer surface of a container, said tear portion being disposed within said upper portion.

7. A closure in accordance with claim 1 wherein the closure material is high density polyethylene.

8. A package comprising in combination a closure in accordance with claim 1 and additionally including a container sealingly engaged by said closure.

9. A closure according to claim 1 additionally including an inner skirt member depending from a top portion and spaced inwardly from said skirt and disposed to frictionally engage the side wall of said container, and wherein said weakened section extends outwardly from the space between said skirt and said inner skirt member.

10. A closure according to claim 1 additionally including an inner skirt member depending from a top portion and spaced inwardly from said skirt and disposed to frictionally engage the side wall of said container, and wherein said weakened section extends outwardly from the space between said skirt and said inner skirt member and toward the intersection of said skirt and said top.

11. A closure according to claim 1 wherein said closure additionally includes a top portion having an annular rib upstanding therefrom for positioning other objects in stacked relation.

12. A flexible closure according to claim 1 and additionally including a rigid member disposed within said skirt and having a surface for sealingly engaging an open top container.

13. A closure according to claim 12 wherein said rigid member additionally has other opposed surfaces for compressively gripping opposite side portions of the container wall.

14. A package comprising in combination a closure in accordance with claim 13 and additionally including an open top container sealingly engaged therewith.

15. A package combination according to claim 14 wherein the flexible portion of said closure includes a top portion and a skirt portion engaging the wall of said container and encompassing said sealing engagement and wherein said tamper resistant means includes a member connected to said skirt portion and to said wall.

16. A closure in accordance with claim 1 wherein said top includes a relatively raised rim portion and a relatively depressed central portion and wherein said skirt includes an upper outwardly offset portion connected by a downwardly and inwardly extending portion to a lower portion for closely engaging said container wall, said weakened section being disposed in said upper portion, and said severably connected member and said distal end being disposed adjacent said central portion.

17. A closure in accordance with claim 1 wherein said top includes a relatively raised rim portion and a relatively depressed central portion and wherein said skirt includes an upper outwardly offset portion connected by a downwardly and inwardly extending portion to a lower portion for closely engaging said container wall, said weakened section being disposed in said lower portion, and said severably connected member and said distal end are disposed adjacent said central portion.

18. A closure according to claim 1 wherein said top includes a relatively raised rim portion and a relatively depressed central portion and wherein said tamper-resistant member is connected between said lifting and gripping member and said central portion.

19. A closure according to claim 18 wherein said weakened section is disposed in said rim portion.

References Cited

UNITED STATES PATENTS

| | | | |
|---|---|---|---|
| 2,751,102 | 6/1956 | Kihm | 220—54 |
| 3,272,368 | 9/1966 | Van Baarn | 215—41 |
| 3,339,790 | 9/1967 | Murdock | 220—54 |

FOREIGN PATENTS

| | | |
|---|---|---|
| 177,835 | 1/1962 | Sweden. |
| 589,629 | 3/1959 | Italy. |
| 1,393,366 | 2/1965 | France. |

DONALD F. NORTON, *Primary Examiner.*